3,042,525
MASS HORMONIZATION OF MEAT-PRODUCING ANIMALS
William Earl Mattox, Indianapolis, Ind., assignor to Mattox and Moore, Inc., Indianapolis, Ind., a corporation of Indiana
No Drawing. Filed Mar. 11, 1957, Ser. No. 644,983
1 Claim. (Cl. 99—2)

This invention relates to the mass hormonization of meat-producing animals, especially poultry; and to compositions for use therein.

In the production of poultry, meat production efficiency and meat quality are enhanced by hormonizing the birds at a selected growth stage or at a predetermined period in advance of dressing. Hormonizing is commonly effected by administering an estrogen, usually diethylstilbestrol. Heretofore, such administration has been done by the implantation of a solid pellet containing diethylstilbestrol, or preferably by the hypodermic injection of a plastic mixture containing diethylstilbestrol. While such methods produce characteristic hormonization results, they are relatively laborious and require the handling of each individual bird of a flock. Moreover, with pellets the handling and treatment produces a shock reaction which interrupts the normal feeding habits of the bird and causes a temporary interruption in its growth.

This estrogen treatment, or hormonization, produces several desirable and advantageous results. It increases the production of edible meat on the bird in comparison with the amount of feed consumed, so that the meat production efficiency is increased. Further, it increases the quality of the meat. There is an increased deposit of fat among the meat fibers, and the meat is more tender. Still further, the treatment improves and hastens the "finish" of the bird, so that it is ready for processing at an earlier time. Results of a similar character are obtained in other animals, particularly in beef cattle.

Attempts have been made to obtain a hormonizing effect by administering an estrogen such as diethylstilbestrol in the feed. This requires special mixing processes under controlled conditions, having as their purpose a uniform distribution of a very small quantity of medicament in a very large quantity of feed, and requires large investment in stocks of treated feed. This method of administration is relatively unreliable, for it is difficult to obtain uniform mixtures, and even with uniform mixtures it is not possible to ensure that the animals will all receive the same quantity of medicament. Moreover, there is considerable waste, and relatively large amounts of the estrogen are required. While this method of administering an estrogen in the feed has been used with some degree of success in beef cattle, it has been found to produce only poor results with poultry.

It is the object of this invention to provide a mass hormonization procedure in which the hormonizing drug is administered in the drinking water supplied to the animals, and especially to poultry; and thereby to provide an improved and more reliable and effective and uniform hormonizing action. It is a further object of the invention to provide liquid concentrates containing hormonizing constituents such as estrogens, and especially a concentrate containing diethylstilbestrol, which can be mixed with water to form drinking water mixtures containing effective quantities of the hormone in stable distribution therein.

I have discovered that hormonization can be produced effectively and reliably in poultry by administering the hormonizing drug in the drinking water consumed by the poultry, and that this can be done on a mass-production basis by the simple expedient of adding the hormonizing drug to the drinking water supplied to a whole flock of poultry, and that such administration will produce uniform high quality results.

The hormonizing drug commonly used in previous hormonizing procedures is the synthetic estrogenic material diethylstilbestrol, and this material is readily available in quantity at reasonable prices. This material is substantially insoluble in water, and this characteristic has caused difficulty in its administration, especially in attempts to administer it in the feed. I have now discovered, further, that hormonizing quantities of diethylstilbestrol can be held uniformly distributed in a desirable drinking water mixture. It is thus a special object of the invention to administer estrogens and especially diethylstilbestrol to poultry in the drinking water and to provide compositions for such administrations.

In accordance with the invention, the hormonizing drug is uniformly distributed in the drinking water, in a stable mixture or solution, in which the daily dose for the flock is contained in an amount of drinking water mixture which the birds will drink during the day. The total amount of drinking water consumed per day by birds at various ages is known and predictable. This total amount may be used to carry the drug, or, to ensure full dosage, the daily dose may be included in a smaller quantity of water and plain water may be supplied to supplement the drinking supply when the medicated water mixture has been consumed. These procedures may be carried out in a manual watering program, or may be carried out with suitable automatic watering devices or proportioning devices.

In addition to the hormonizing drug, the drinking water may also contain other medicaments, and desirably does contain germicidal or sanitizing constituents.

The hormones may be included in the water in the form of water soluble compounds and may be included in combination with other constituents, and such other constituents may include ones which aid in holding in the drinking water effective proportions of a hormone compound which is normally relatively water insoluble. The hormones and other constituents may be added directly to the drinking water. Preferably, however, they are prepared in a liquid concentrate, and a controlled proportion of such concentrate is added to the drinking water.

The hormone used is desirably an estrogenic material. Water soluble estrogenic materials which can be used include alkali metal salts of diethylstilbestrol di-(sulfoacetate), as disclosed in U.S. Patent No. 2,537,868; and alkali metal salts of diethylstilbestrol diphosphate, of U.S. Patent No. 2,234,311. Other known water-soluble estrogenic materials include conjugated estrogenic substances, and the reaction products disclosed in Patent No. 2,359,276.

The hormonizing compound is administered in a concentration sufficient to produce characteristic hormonizing results over a suitable treatment period, of the order of from three weeks to thirty days. An estrogenic compound is desirably administered to chickens in a daily dose per chicken equivalent to about 0.3 mg. to about 2.0 mg. of diethylstilbestrol, and preferably equivalent to about 0.6 mg. to about 1.0 mg. of diethylstilbestrol. The desired dosage is thus in an amount such that each chicken will receive the equivalent of from 10 mg. to 50 mg., and desirably about 20 mg., of diethylstilbestrol over a thirty day treatment period.

To this end, concentrates were experimentally prepared containing an amount of hormone equivalent to a concentration of from 0.25 mg. to 1.325 mg., and preferably about 0.53 mg., of diethylstilbestrol per cc.; and about 125 cc. of such concentrate was included in the drinking water for each 100 chickens each day. The concentrates may contain other medicaments, and preferably do contain a sanitizer. For commercial use, higher-strength concentrates may be used, desirably at concentrations such that one gallon will be sufficient to treat 1,000 birds.

The optimum dosage of 20 mg. of diethylstilbestrol itself per chicken over a thirty day period may be obtained as follows: The relatively water-insoluble diethylstilbestrol is dissolved in a liquid polyethylene glycol, such as the product available on the market as polyethylene glycol 200 and consisting of a mixture of polyethylene glycols having an average molecular weight of 200. The solution is desirably in a concentration of 2 grams of diethylstilbestrol in from 25 to 100 grams of polyethylene glycol 200. This solution is preferably first mixed with an aqueous alkaline solution containing alkalizing compounds which have a solubilizing effect for the diethylstilbestrol, which desirably have germicidal and sanitizing properties, and which are non-toxic in the concentratons which will occur in the final drinking water mixture. The alkaline mixture desirably also includes one or more germicidal and sanitizing ingredients such as one of the quaternary ammonium salts available on the market for addition to poultry drinking water as a sanitizing agent, and which have solubilizing properties as wetting agents. The sanitizer and the alkalizing compounds may be mixed in concentrated solution with the polyethylene glycol solution, and this mixture then diluted to a predetermined volume, say a gallon, to form the concentrate for admixture with the drinking water.

Such a concentrate of diethylstilbestrol with polyethylene glycol and aqueous alkali, and preferably also with quaternary ammonium salts, readily provides a concentration of two grams of diethylstilbestrol per gallon; and such gallon of concentrate is suitable and sufficient to be added to the drinking water for a hundred chickens over a period of thirty days, to provide each chicken with a total of about 20 mg. of diethylstilbestrol during the treatment period. In the concentrate described above, and in drinking water mixtures prepared with such concentrate, the diethylstilbestrol remains in stable distribution, so that it is consumed in the intended dosage uniformly by all the chickens drinking the water.

Both with diethylstilbestrol and with other hormonizing compounds, such as the salts mentioned above, I prefer to make an initial solution thereof in liquid polyethylene glycol, for stability and to facilitate distribution in the water.

The following examples illustrate the invention and its results:

EXAMPLE 1

A flock of chickens was divided into six groups of approximately 100 birds each. One group was used as a control group and the other five groups were treated with different hormonizing mixtures or compounds in their drinking water. The chickens used were a White Rock breed sometimes referred to as "Cornish Cross" breed, which is a standard meat-type bird. The birds were seven weeks old at the start of the hormonizing treatment.

The six groups of chickens were placed in separate pens, with separate water and feed supplies, and arrangements were such that records could be kept of the quantities of water and feed consumed. All six groups were fed the same standard broiler feed, containing nominally 20% protein and 20% carbohydrate. All groups were given all the feed they would eat. Six batches of concentrate were prepared for administration to the six groups of chickens as follows:

Group 1—*No hormone, sanitizer only.*—The concentrate used for this control group was a commercial sanitizer mixture. One gallon of concentrate was prepared containing 170 cc. of sanitizer. This was supplied to the birds by adding 125 cc. of the concentrate to each days drinking water for the chickens in group 1. The sanitizer is desirably used to give a concentration of from 100 to 200 p.p.m. in the drinking water, and the amounts set forth were calculated to give approximately 100 p.p.m.

The sanitizer used both in this concentrate and in certain of the concentrates described below was a commercial mixture of the following composition:

|  | Percent |
|---|---|
| (a) Alkyl ($C_9$–$C_{15}$) tolyl methyl trimethyl ammonium chlorides (obtained from Rohm & Haas Company under the trademark "Hyamine 2389"), approximately | 20 |
| (b) Tetra potassium salt of ethylene diamine tetraacetic acid, approximately | 2.5 |
| (c) Tripotassium phosphate, approximately | 3 |
| (d) Aqueous sodium bicarbonate solution, approximately | 74.5 |

Group 2—*20 mg./bird/30 days of disodium salt of diethylstilbestrol di-(sulfoacetate). No sanitizer.*—For this group a one gallon quantity of concentrate was prepared containing 1.1 mg. per cc. of the disodium salt of diethylstilbestrol di-(sulfoacetate), which amount is the molecular equivalent of 0.53 mg. of diethylstilbestrol per cc. This gallon of concentrate was prepared as sufficient, when added to the drinking water over a period of thirty days, to provide each of 100 birds with 20 mg. of diethylstilbestrol equivalent over the thirty day period. The concentrate contained no sanitizer.

This concentrate was supplied to the birds in group 2 by adding 125 cc. of the concentrate in each days water supply for the chickens in group 2. It was known that water consumption of chickens under the test conditions would range from approximately 3 gallons per day per 100 birds at seven weeks of age, to approximately 5 gallons per day per 100 birds at ten weeks of age. In practice, the concentrate was added to a major portion of the day's drinking water supply, this was supplied to the group of chickens, and when it had been consumed additional plain water was supplied.

Group 3—*20 mg./bird/30 days of disodium salt of diethylstilbestrol diphosphate. No sanitizer.*—For this group, a one gallon quantity of concentrate was prepared containing a concentration of 0.9 mg. of the disodium salt of diethylstilbestrol diphosphate per cc., which concentration is the molecular equivalent of 0.53 mg. of diethylstilbestrol per cc. The concentrate contained no sanitizer. The gallon of concentrate was prepared as sufficient to provide each of 100 birds with 20 mg. diethylstilbestrol equivalent over a thirty day period. This concentrate was used by adding 125 cc. of the concentrate to each days water supply for the chickens in group 3, in the same way as with group 2.

Group 4—*10 mg./bird/30 days of disodium salt of diethylstilbestrol di-(sulfoacetate); with sanitizer.*—The concentrate for this group contained the same hormonizing compound as that for group 2, but contained only half as great a concentration, that is, only 0.55 mg. per cc. of concentrate, to give a dosage of only 10 mg. of diethylstilbestrol equivalent to each bird over a thirty day period. In addition, the gallon of concentrate contained 170 cc. of the sanitizer composition used for group 1, as described above. The concentrate was used by adding 125 cc. of it in each days water supply for the chickens of group 4, in the same way as with group 2.

Group 5—*50 mg./bird/30 days of disodium salt of diethylstilbestrol di-(sulfoacetate); with sanitizer.*—The concentrate for this group was the same as that for group 4, except that it contained five times the concentration of hormonizing compound, that is, 2.75 mg. per cc., so that the one gallon was sufficient to provide each of 100 birds with 50 mg. of diethylstilbestrol equivalent over the thirty day period. The concentrate also contained 170 cc. of the same sanitizer used for group 1. This extra-strength concentrate was used by adding 125 cc. of it to each days water supply for the chickens of group 5, in the same way as for group 2.

*Group 6—20 mg./bird/30 days of diethylstilbestrol; with sanitizer.*—The concentrate for this group was prepared as follows: A two-gram quantity of diethylstilbestrol was dissolved in 25 grams of polyethylene glycol 200. Solution was facilitated by heating. The solution so prepared was mixed with 170 cc. of the same sanitizer described above as used for group 1. This mixture of diethylstilbestrol in polyethylene glycol and of sanitizer was diluted to one gallon with water. The resulting concentrate contained diethylstilbestrol in a concentration of 0.53 mg. per cc., and the one gallon of concentrate was sufficient to provide 20 mg. of total diethylstilbestrol to each of 100 birds over a period of thirty days. The concentrate was used by adding 125 cc. of concentrate to each days water supply for the chickens of group 6, in the same manner as for group 2.

The six groups of chickens were grown under the described test conditions—in separate pens, with separate feed supplies, and provided with different drinking water mixtures as described above—for a period of three weeks. Approximately half of the birds of groups 1 and 2, and all of the birds of groups 3 through 6 were then dressed for market. The dressed carcasses were graded by independent grading experts, with respect to nine characteristics generally considered indicative of quality and of the presence and degree of hormonizing effect. The grading was scored by the system in which a score of 50 indicates a good grade or condition in chickens which have not received hormonizing treatment, and higher scores indicate the higher grades and improved conditions resulting from hormonization and characteristic of hormonized chickens.

The results of the tests and scoring with the six groups of chickens are set forth in the following Table I.

The results obtained as set forth in Table I establish that the chickens in each of groups 2 through 6 underwent characteristic hormonizing effects, and that the desired effects occurred with a high degree of uniformity on all the birds of each group. This is shown especially by the fact that graded characteristics were improved in high degree with the same or better "feed conversion ratios" and "production efficiency" indices; and by the valuable improvements in percent yield.

The tests lasted only 21 days instead of the 30 for which dosages were originally calculated, and the birds of groups 2 through 5 actually received only about two-thirds of the calculated 30-day dosage. The 72 birds of group 6 consumed the intended dosage for 100 birds, and this substantially offset the reduction in dosage resulting from the shortened treatment period, and the birds of group 6 thus received substantially the intended 20 mg. dosage over the three-week period.

The characteristic hormonization effects were obtained in high degree with total dosages actually ranging from only about 7 mg. of diethylstilbestrol equivalent in group 4, to 42 mg. in group 5. Taking into account the relative number of pullets to cockerels in the several groups, the results indicate that optimum results can be obtained with dosages of the order of 20 mg., and that larger dosages, while effective, are not necessary and merely increase the cost of medicament. The results thus indicate that this method of hormonizing by way of the drinking water is effective with dosages not far different from those which are effective by injection.

EXAMPLE 2

Additional growth experiments were carried out under controlled conditions similar to those set forth in Example 1, and different groups of chickens were supplied with different hormonizing compositions by including the same in the drinking water. In these tests, however, instead of feeding the chickens a standard high-protein broiler feed, a lower-priced feed was used containing a lower percentage of protein and a higher percentage of carbohydrate. The results confirm Example 1, and show the further hormonization characteristic that treated birds are able to assimilate the low-protein, high-carbohydrate feed, and to produce equivalent or better grade products efficiently and economically.

I claim as my invention:

A hormonizing concentrate for addition to drinking water of meat-producing animals to increase the meat-

*Table I*

| | Group 1 | Group 2 | Group 3 | Group 4 | Group 5 | Group 6 |
|---|---|---|---|---|---|---|
| Number of birds | 80 | 95 | 101 | 97 | 97 | 72 |
| cockerels | 43 | 43 | 53 | 43 | 40 | 37 |
| pullets | 37 | 52 | 48 | 54 | 57 | 35 |
| Average Weight—10 wks.: | | | | | | |
| cockerels (lbs.) | 4.30 | 4.66 | 4.66 | 4.43 | 4.34 | 4.54 |
| pullets (lbs.) | 3.54 | 3.45 | 3.60 | 3.41 | 3.47 | 3.47 |
| Total Live Wt. (lbs.) | 316.0 | 379.8 | 420.5 | 375.0 | 371.5 | 289.5 |
| Total Feed—10 wks. (lbs.) | 824.7 | 978.0 | 1028.0 | 979.0 | 972.0 | 754.0 |
| Feed Conversion Ratio | 2.61 | 2.58 | 2.44 | 2.61 | 2.62 | 2.60 |
| Production Efficiency | 151 | 155 | 158 | 144 | 146 | 155 |
| Birds Dressed | 50 | 50 | 101 | 97 | 50 | 72 |
| cockerels | 25 | 25 | 53 | 43 | 25 | 37 |
| pullets | 25 | 25 | 48 | 54 | 25 | 35 |
| Total Live Wt. (lbs.) | 201.0 | 198.5 | 420.5 | 375.0 | 199.0 | 289.5 |
| Eviscerated Wt. (lbs.) | 133.2 | 140.2 | 303.0 | 253.0 | 142.0 | 231.0 |
| Percent Yield | 66.3 | 70.7 | 72.2 | 67.5 | 72.4 | 79.8 |
| Grading Scores: | | | | | | |
| Breast Finish | 55 | 85 | 75 | 85 | 85 | 80 |
| Vent Fat | 55 | 70 | 85 | 75 | 75 | 60 |
| Pigmentation | 50 | 70 | 65 | 70 | 75 | 65 |
| Uniformity | 50 | 85 | 75 | 80 | 90 | 75 |
| General Appearance | 50 | 90 | 70 | 85 | 90 | 80 |
| Shanks | 75 | 75 | 75 | 75 | 75 | 75 |
| Wattles | 50 | 95 | 60 | 70 | 90 | 70 |
| Combs | 50 | 95 | 60 | 75 | 95 | 75 |
| Feathering | 65 | 65 | 65 | 65 | 65 | 65 |

Treatments:
  Group 1—Control. No hormone. Sanitizer only.
  Group 2—20 mg. diethylstilbestrol di-(sulfoacetate). No sanitizer.
  Group 3—20 mg. diethylstilbestrol diphosphate. No sanitizer.
  Group 4—10 mg. diethylstilbestrol di-(sulfoacetate). With sanitizer.
  Group 5—50 mg. diethylstilbestrol di-(sulfoacetate). With sanitizer.
  Group 6—20 mg. diethylstilbestrol. With sanitizer.

producing efficiency of said animals, comprising a liquid polyethylene glycol solution of diethylstilbestrol and a solubilizing agent, said solubilizing agent being a quaternary ammonium salt.

References Cited in the file of this patent

UNITED STATES PATENTS

| | | |
|---|---|---|
| 2,234,311 | Miescher et al. | Mar. 11, 1941 |
| 2,544,698 | Lorenz | Mar. 13, 1951 |
| 2,734,482 | Seltzer | Feb. 14, 1956 |
| 2,824,546 | Klette | Feb. 25, 1958 |

OTHER REFERENCES

Folley: Jr. Endocrinology, vol. 4 (1944–1946), pp. 23–36.

Jr. and Clin. Endocrinology 9, 4 (April 1, 1949), pp. 382–384, 167–74S.